United States Patent
Grosch

(10) Patent No.: US 12,330,221 B2
(45) Date of Patent: *Jun. 17, 2025

(54) TOOL HOLDER WITH MEASURING APPARATUS

(71) Applicant: Haimer GmbH, Igenhausen (DE)

(72) Inventor: Thomas Grosch, Darmstadt (DE)

(73) Assignee: Haimer GmbH, Igenhausen (DE)

( * ) Notice: Subject to any disclaimer, the term of this patent is extended or adjusted under 35 U.S.C. 154(b) by 154 days.

This patent is subject to a terminal disclaimer.

(21) Appl. No.: 17/451,350

(22) Filed: Oct. 19, 2021

(65) Prior Publication Data

US 2022/0118529 A1 Apr. 21, 2022

(30) Foreign Application Priority Data

Oct. 19, 2020 (DE) ...................... 10 2020 127 509.9

(51) Int. Cl.
*B23B 31/02* (2006.01)
*B23Q 17/09* (2006.01)
(Continued)

(52) U.S. Cl.
CPC .......... *B23B 31/02* (2013.01); *B23Q 17/0966* (2013.01); *B23B 31/1179* (2013.01);
(Continued)

(58) Field of Classification Search
CPC ................ B23B 31/02; B23B 31/1207; B23B 2260/128; B23B 2270/48; B23B 2270/24;
(Continued)

(56) References Cited

U.S. PATENT DOCUMENTS 9,102,026 B2 * 8/2015 Miller ..................... B23Q 17/22
10,001,396 B2 * 6/2018 Schneider ............... G01L 15/00
(Continued)

FOREIGN PATENT DOCUMENTS

CN 108747586 A * 11/2018 ......... B23Q 17/0957
CN 109128321 A * 1/2019 ............... B23C 5/00
(Continued)

OTHER PUBLICATIONS

Bleicher, et al., "Using Sensory Tool Holder Data for Optimizing Production Processes", Journal of Machine Engineering, 2018, vol. 18, No. 3, pp. 16-27.
Schoeghofer, et al., "Using Sensory Tool Holder Data for Optimizing Production Processes", Journal of Machine Engineering, 2019, vol. 19, No. 3, pp. 43-55.
Bleicher, et al., CIRP Annals—Manufacturing Technology 69 (2020), pp. 101-104.

*Primary Examiner* — Eric A. Gates
*Assistant Examiner* — Reinaldo A Vargas Del Rio

(57) ABSTRACT

A tool holder is configured for rotation about a tool holder axis of rotation defining an axial direction. The tool holder, at one axial longitudinal end thereof, has a tool section with a tool-receiving formation for receiving a tool and, at the opposite axial longitudinal end, has a coupling section with a coupling formation for torque-transmitting coupling to a machine spindle of a machine tool. A measuring apparatus is configured for acquiring data relating to the operation of the tool holder. The measuring apparatus has a sensor, in particular an acceleration sensor, with at least two measurement axes. The two measurement axes are oriented substantially radially with respect to the tool holder axis of rotation.

17 Claims, 6 Drawing Sheets

(51) Int. Cl.
    *B23B 31/117*  (2006.01)
    *B23B 31/20*   (2006.01)
    *B23B 31/30*   (2006.01)
    *B23Q 17/12*   (2006.01)

(52) U.S. Cl.
    CPC ............ *B23B 31/20* (2013.01); *B23B 31/305* (2013.01); *B23B 2231/24* (2013.01); *B23B 2260/128* (2013.01); *B23B 2270/24* (2013.01); *B23B 2270/32* (2013.01); *B23B 2270/48* (2013.01); *B23Q 17/0976* (2013.01); *B23Q 17/12* (2013.01)

(58) Field of Classification Search
    CPC ............ B23Q 17/0966; B23Q 17/0976; B23Q 17/12
    See application file for complete search history.

(56) References Cited

U.S. PATENT DOCUMENTS

| | | | | |
|---|---|---|---|---|
| 10,665,912 | B2 * | 5/2020 | Jennrich | H01M 10/655 |
| 10,953,509 | B2 * | 3/2021 | Baratta | B23Q 17/0995 |
| 11,285,543 | B2 * | 3/2022 | Ostling | B23Q 17/12 |
| 2009/0234490 | A1 * | 9/2009 | Suprock | B23B 31/02 |
| | | | | 408/116 |

FOREIGN PATENT DOCUMENTS

| CN | 110091215 A | * | 8/2019 | |
|---|---|---|---|---|
| DE | 102018109880 A1 | * | 6/2019 | |
| EP | 0459948 A2 | * | 12/1991 | |
| WO | WO-2017068158 A1 | * | 4/2017 | ............ B23B 31/02 |

* cited by examiner

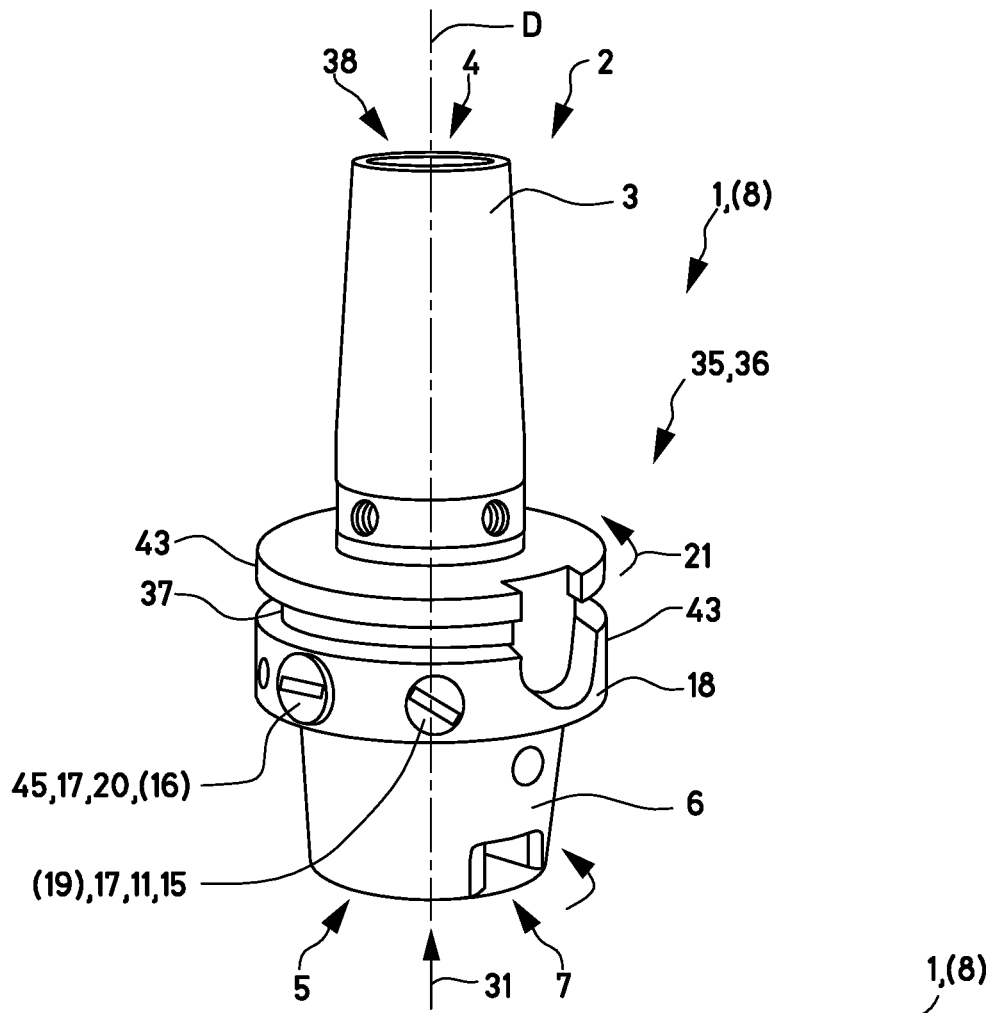
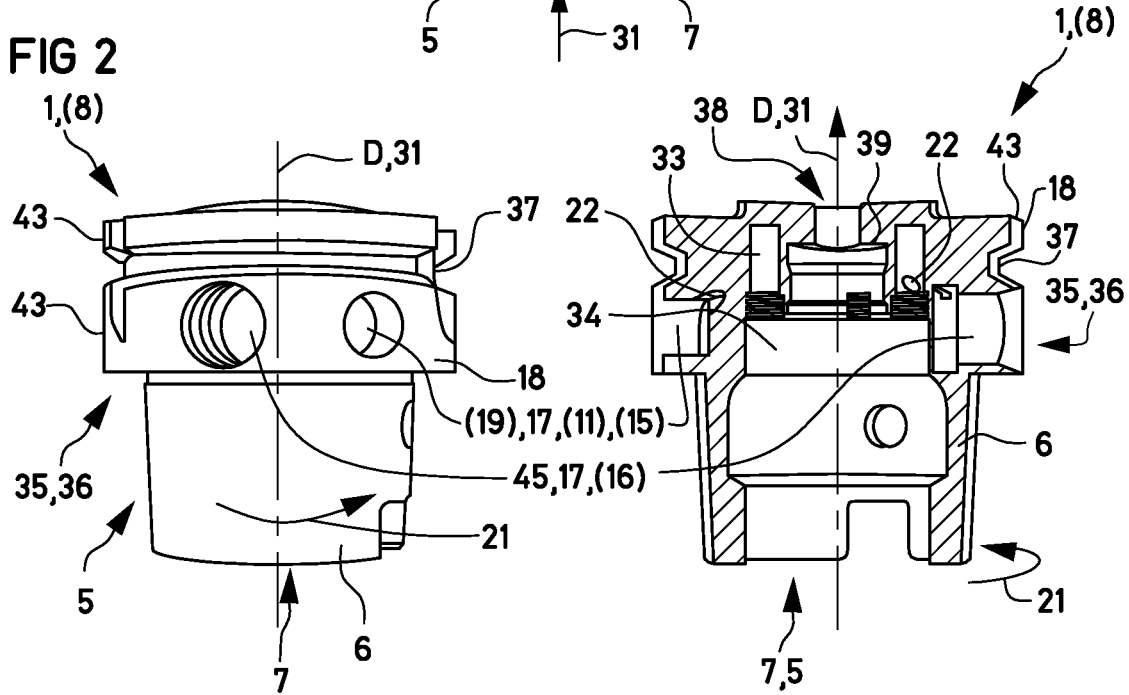

TOOL HOLDER WITH MEASURING APPARATUS

CROSS-REFERENCE TO RELATED APPLICATION

This application claims the priority, under 35 U.S.C. § 119, of German Patent Application DE 10 2020 127 509.9, filed Oct. 19, 2020; the prior application is herewith incorporated by reference in its entirety.

FIELD AND BACKGROUND OF THE INVENTION

The invention relates to a tool holder which is designed for rotation about a tool holder axis of rotation (D) defining an axial direction and which, at one axial longitudinal end thereof, has a tool section with a tool-receiving formation for receiving a tool and, at the other axial longitudinal end thereof, has a coupling section with a coupling formation for torque-transmitting coupling to a machine spindle of a machine tool. The tool holder provides a measuring apparatus for acquiring data relating to an operation of the tool holder.

Such a tool holder with a measuring apparatus is known from "In-Process Control with a Sensory Tool Holder to Avoid Chatter", F. Bleicher, et al., Journal of Machine Engineering, 2018, Vol. 18, No. 3, 16-27, "Using Sensory Tool Holder Data for Optimizing Production Processes", P. Schörghofer, et al., Journal of Machine Engineering, 2019, Vol. 19, No. 3, 43-55, or "Method for Determining Edge Chipping in Milling based on Tool Holder Vibration Measurements", F. Bleicher, et al., CIRP Annals—Manufacturing Technology 69 (2020) 101-104.

In the case of the tool holder known therefrom, the measuring apparatus is a uniaxial acceleration sensor with a single measurement axis oriented radially with respect to the tool holder axis of rotation (D). The acceleration sensor thus outputs a measurement axis signal associated with the radial measurement axis.

By means of this tool holder having such an acceleration sensor, it is possible, as described, for monitoring of an operating behavior in the case of this tool holder, for example an observation of vibrations or an identification of instabilities, such as chatter, in the tool holder, here in the case of a milling operation (here, a milling tool is then received in the tool-receiving formation of the tool holder), to be performed namely such that the measurement axis signal measured by the uniaxial acceleration sensor during the milling operation is analyzed over the course of time or in the frequency spectrum. For example, "abnormal" (for example abrupt) changes in the measurement axis signal of the uniaxial acceleration sensor over the course of time may indicate an instability.

A disadvantage in the case of this monitoring—considered here by way of example—of a milling processing operation by means of such a tool holder with measuring apparatus/acceleration sensor may be that the signals/data output by the measuring apparatus of the tool holder for the processing operation model the operation of the tool holder, such as the milling process in this case, only inadequately or with low informativeness, whereby the (process) monitoring is also only inadequately possible. In short, the tool holder with measuring apparatus outputs (process) signals/(process) data that can be interpreted with regard to the process only with difficulty.

SUMMARY OF THE INVENTION

It is accordingly an object of the invention to provide a tool holder which overcomes the above-mentioned disadvantages of the heretofore-known devices and methods of this general type and which provides for a refined tool holder that can model its operation or a processing process with improved informativeness (i.e., an increased level of information).

With the above and other objects in view there is provided, in accordance with the invention, a tool holder configured for rotation about a tool holder axis of rotation defining an axial direction, the tool holder comprising:
  a first axial longitudinal end having a tool section with a tool-receiving formation for receiving a tool;
  a second axial longitudinal end having a coupling section with a coupling formation for torque-transmitting coupling to a machine spindle of a machine tool;
  a measuring apparatus for acquiring data relating to an operation of the tool holder, said measuring apparatus having a sensor with at least two measurement axes that are oriented substantially radially with respect to the tool holder axis of rotation.

Terms such as up, down, front, rear, left or right are to be understood in accordance with conventional understanding unless explicitly defined otherwise. Terms such as radial and axial are to be understood in relation to a tool holder axis of rotation (D) of the tool holder.

The term "substantially" should be understood to mean "to a practically still significant degree". Possible deviations from exactness that are thus implied by this term may arise unintentionally (that is to say without any functional basis) owing to manufacturing or assembly tolerances or the like.

The tool holder which is designed for rotation about a tool holder axis of rotation (D) defining an axial direction provides, at one axial longitudinal end thereof, a tool section with a tool-receiving formation for receiving a tool. Axially at the other axial longitudinal end thereof, there is provided a coupling section with a coupling formation for torque-transmitting coupling to a machine spindle of a machine tool.

The tool holder also has a measuring apparatus for acquiring data relating to an operation of the tool holder.

The measuring apparatus is in this case a sensor, in particular an acceleration sensor, with at least two measurement axes which are oriented substantially radially with respect to the tool holder axis of rotation (D).

The measuring apparatus may however also comprise other sensor systems that output direction-dependent signals, such as a force, speed or deformation sensor or a travel measuring system.

The invention will be discussed by way of example below using a sensor in the form of an acceleration sensor.

The acceleration sensor in this case outputs (measurement/measurement axis) signals (which are assigned to the measurement axes), thus for example in each case one (measurement) signal for one/each of its measurement axes, which (measurement) signals, when evaluated or interpreted or generally processed, as (measurement) data, describe or model the operation of the tool holder. For the sake of simplicity, the terms (measurement/measurement axis) signals and (measurement) data may thus also be used synonymously for one another.

The tool holder is based on the realization that an acceleration sensor designed and arranged in the tool holder in this way—with at least two measurement axes that are oriented substantially radially with respect to the tool holder axis of rotation (D)—is better capable of describing or modelling the operation of the tool holder by way of the (measurement) signals/(measurement) data that it generates—and can thus more informatively describe a processing process carried out using a tool holder (with such a sensor configuration). More reliable analyses and improved predictions, for example abnormal operating states, instabilities, tool breakages or tool wear, are thus possible.

Tests using tool holders equipped with sensors have shown that, in particular, simple uniaxial sensors or tool holders with simple uniaxial sensors can output less informative data relating to processing processes, from which it is thus less reliably possible to identify abnormal operating states, instabilities, tool breakages, tool wear or the like.

FIG. 10 shows, for example, processing/sensor data of a tool holder, in this case an end mill with a number of teeth z=4, using a uniaxial acceleration sensor—with one measurement axis oriented radially (32). The process parameters are n=2400 rpm, $a_P$ (cutting depth)=2 mm and $a_e$ (working engagement)=4 mm.

Here, FIG. 10 shows—in a 3D illustration—a spectral analysis versus the time. Here, the time axis runs from the bottom to the left, and the frequencies increase downward from the right. The expected tooth meshing frequency is 160 Hz. This cannot be seen at first glance from FIG. 10.

By contrast, FIG. 11 shows processing/sensor data of a tool holder, in this case again the end mill with a number of teeth z=4, with in this case a biaxial acceleration sensor—with two orthogonal measurement axes (x, y) oriented radially (32). The two (measurement/measurement axis) signals x, y or the (measurement) data thereof have been combined to form a resultant $R_{xy}$ in accordance with the rule/formula:

$$R(x_i)=\mathrm{Sqr}(\mathrm{Sum}(x_i^2)) \quad (1)$$

where:
xi measurement axis signal of the axis i
Sqr square root
Sum sum.

The process parameters are again n=2400 rpm, $a_P$ (cutting depth)=2 mm and $a_e$ (working engagement)=4 mm.

FIG. 11 again shows—in a 3D illustration—the spectral analysis versus the time. Here, the time axis again runs from the bottom to the left, and the frequencies again increase downward from the right. The expected tooth meshing frequency is again 160 Hz—and can this time be clearly identified as the dominant frequency in FIG. 11 (denoted by ZEF).

In a refinement, the acceleration sensor may be designed in a variety of ways. For example, in one refinement, provision may be made for the acceleration sensor to have (exactly) two measurement axes, which are in particular oriented orthogonally with respect to one another.

It may also be expedient for the at least two measurement axes which are oriented substantially radially with respect to the tool holder axis of rotation (D) to be aligned with orientation features of the tool holder, such as an index notch or drivers in the case of the hollow shaft cone. With sufficiently fast communication, ideally in real time, with a machine controller, an assignment of an angle of rotation can thus be possible. A form of phasor representation of vibrations in machine coordinates would thus also be possible.

In another refinement, the acceleration sensor may also have three measurement axes, which in this case in particular span an orthogonal coordinate system, wherein—in this case—the third measurement axis may be oriented substantially axially with respect to the tool holder axis of rotation (D).

If a/the resultant (R) of the measurement axis signals (or measurement axis data) is to be calculated, for example by means of an evaluation unit, for example a microprocessor/microcontroller, or in the course of condition monitoring (CM) or in a condition monitoring system (CMS), this can be performed in accordance with the following rule:

$$R(x_i)=\mathrm{Sqr}(\mathrm{Sum}(x_i^2)) \quad (1)$$

where:
$x_i$ measurement axis signal of the axis i
Sqr square root
Sum sum

Equation (1) may also be vectorial, in particular in the case of non-orthogonally oriented sensors.

Other mathematical operations for calculating the resultant from the measurement axis signals/data are conceivable.

The third measurement axis or the signals thereof may optionally also be evaluated separately. Here, from cutting force tests with multi-component dynamometers, it is already known that axial axis signals exhibit significant signal variations in the presence of instabilities.

It is furthermore expedient if the tool holder has further electronics components, in particular a microcontroller, one or more transmission devices, in particular one or more antennae, one or more circuit boards and/or one or more energy supplies.

Furthermore, provision may also be made for the acceleration sensor to be arranged on a separate circuit board, in particular on a different circuit board than the microcontroller. In this way, it is possible to realize more flexible arrangements of the components—also as advantageous modular structural systems (with flexible exchangeability)—in the tool holder.

Here, the circuit board that bears the microcontroller may be configured as a flexible circuit board, which can thus give rise to an expedient installation situation in the tool holder.

The one or more transmission devices or antennae may also be arranged on one or more separate circuit boards.

Such distributed arrangements thus allow an advantageous modular construction in the tool holder with simplified exchangeability.

The antenna may expediently be an SMD (surface mounted device) antenna or a wire antenna or a self-adhesive foil antenna. Provision may also be made here for the SMD antenna or the wire antenna to be arranged on a separate circuit board (modular construction/modular system).

Provision may furthermore also be made for a transmission device, in particular antenna, and/or an energy supply to be arranged in recessed fashion in a depression on an outer surface of the tool holder. Contrary to the conventional academic wisdom, it has been found that suitable antennae even composed of a depression in metallic surroundings still exhibit sufficient transmission power.

Such a depression may expediently—and as a technically simply implementable solution—be formed as a circular, preferably circular-cylindrical, pocket on the outer surface of the tool holder, which depression is in particular potted, in particular using a silicone compound, and/or covered. It has also been found that these shapes of the pocket have a favorable effect on the transmission characteristics of the antenna.

In one refinement, two or more transmission devices, in particular two or more antennae, in particular wire antennae, are provided, which are in particular arranged so as to be distributed in a circumferential direction about the tool holder axis of rotation (D). For example, if one of the two or more antennae is situated in a transmission shadow, the other antenna(e) can (redundantly) transmit data. Uninterrupted data transmission can thus be ensured.

Furthermore, provision may also be made for one or more connection bores to run obliquely with respect to the tool holder axis of rotation (D), in particular such that a connection bore for a connection line of the acceleration sensor or of an antenna runs obliquely with respect to the tool holder axis of rotation (D). Oblique bores with cable guides in this regard assist in avoiding cable kinking, and thus make the systems more fail-safe.

In one refinement, provision is also made for the acceleration sensor to have an SPI or I²C interface and/or for electronics in the tool holder to have SPI or I²C interfaces and/or an SPI or I²C bus. SPI interfaces or an SPI bus allow high data rates, for example higher than I²C interfaces.

The acceleration sensor may also have an analog output.

Here, the SPI interface has proven advantageous as a communication path between sensor and microcontroller. This allows sufficiently high data rates and can also be utilized for communication with other electronics components.

Furthermore, it may also be expedient for an energy supply to be realized by means of, in particular kinetic, energy harvesting, with in particular a coolant flow in the tool holder being used for generating energy, in particular by means of a turbine in a coolant channel in the tool holder.

Alternatively or in addition, energy supplies can be provided by means of batteries and/or storage batteries. If storage batteries are used, these may either be provided as exchangeable storage batteries, or they can alternatively also be recharged in the installed state. In the latter case, corresponding contacts are provided on the tool holder (not illustrated). As a particular storage battery variant, it would also be possible in this case to use so-called supercaps (supercapacitors or ultracapacitors). These have the advantage that they can be charged much more quickly than normal storage batteries, and furthermore withstand a very much greater number of charging cycles.

It is particularly expedient if the acceleration sensor is arranged in the tool holder axis of rotation (D) or close to the tool holder axis of rotation (D). The positioning of the acceleration sensor has the influence that a base load $a_{zp}$ (centripetal acceleration) varies with the square of the rotational speed n, and the spacing of the acceleration sensor to the tool holder axis of rotation (D) should therefore be kept as small as possible for monitoring of high rotational speeds. In this way, the measurement range of the acceleration sensor is only insignificantly restricted. The rotational-speed-dependent influence on the measurement result is reflected both in the time signal and in the frequency spectrum by a shift of the amplitude with the magnitude of the base load $a_{zp}$. This must be observed if the vibration intensity is taken into consideration for an evaluation. The measured maximum value then does not correspond to the stimulation by the process, but is informative only after the shift has been subtracted.

With suitable calibration of the measurement system, it is even possible to identify an eccentricity of the tool that has been clamped into the machine spindle, through analysis of the base load $a_{zp}$.

In one refinement, provision is made for the tool-receiving formation to be a shrink chuck or a hydraulic expansion chuck or a face mill arbor or a collet chuck or a power chuck.

The coupling formation may for example also be or comprise a hollow shaft cone or a steep-angle taper and/or an engagement formation for a ball-type clamping system or a polygonal hollow shaft.

In particular, it is expedient if a machine tool is equipped with a tool holder according to the invention, or with tool holders refined as described above. It is thus possible for processes to be monitored on the machine tool.

The above description of the invention and of advantageous configurations of the invention contain numerous features that are depicted individually and in some cases together in combination in the individual (main/dependent) claims. These features may however expediently also be considered individually for a/the tool holder and/or combined to form further meaningful combinations.

Even if some terms have been used in each case in the singular or in conjunction with a numeral in the description or in the patent claims, the scope of the invention is not intended to be restricted to the singular or to the respective numeral for said terms. Furthermore, the words "a" or "an" are to be understood not as numerals but as indefinite articles.

The above-described characteristics, features and advantages of the invention, and the manner in which these are achieved, will become clearer and more distinctly understandable in conjunction with the following description of the exemplary embodiments of the invention, which will be discussed in more detail in conjunction with the drawings/figures (identical parts/components and functions are denoted by the same reference designations in the drawings/figures).

The exemplary embodiments serve for the explanation of the invention and do not restrict the invention to the combinations of features, including functional features, specified therein. Furthermore, for this purpose, suitable features of each exemplary embodiment may also explicitly be considered in isolation, taken from one exemplary embodiment, introduced into another exemplary embodiment in order to supplement the latter, and combined with any of the claims.

Other features which are considered as characteristic for the invention are set forth in the appended claims.

Although the invention is illustrated and described herein as embodied in tool holder with measuring apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 shows a tool holder with clamping chuck (in this case shrink chuck) according to one embodiment;

FIG. 2 shows a part of the tool holder as per FIG. 1 with battery compartment and antenna pocket;

DETAILED DESCRIPTION OF THE INVENTION

Figure 3:
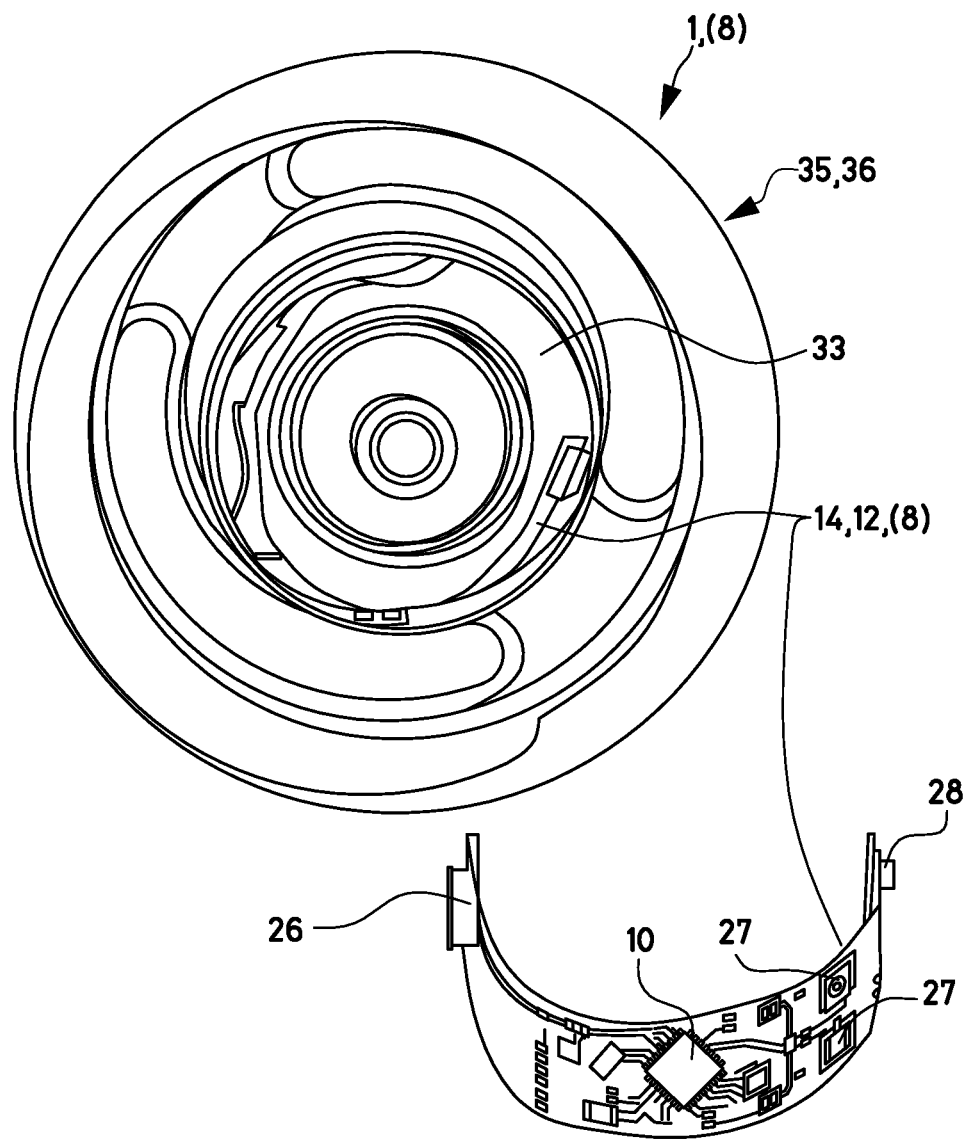
FIG. 3 shows a view of the tool holder as per FIG. 1 with a position of the (flexible) main board.

Referring now to the figures of the drawing in detail, the first part of the following description will be directed to a tool holder 1 with a sensor arrangement as illustrated in FIGS. 1 to 8.

FIG. 1 shows a first embodiment of a tool holder 1 according to the invention, hereinafter referred to for short merely as tool holder 1 or first tool holder 1.

The tool holder 1 comprises a tool holder main body 35, which will hereinafter be referred to merely as main body 35. In order to achieve the greatest possible stiffness, the main body 35 is in this case of single-piece form. Said main body is produced in the conventional manner from metal.

In the context of the present invention, a single-piece configuration is also present if a component is generated in an additive process, for example from metal powder, or is assembled from multiple components in non-detachable fashion, for example by welding or brazing.

The tool holder 1, which extends (axially 31) along a tool holder axis of rotation D, hereinafter referred to merely as axis of rotation D, has a tool section 3 at its tool-side longitudinal end 2 (also referred to as a first axial end 2) and has a coupling section 6 at its opposite, coupling-side longitudinal end 5 (also referred to as a second axial end 5).

The tool section 3 comprises a tool-receiving formation 4 in the form of a tool-receiving recess 4. A shaft of a tool (not illustrated in FIG. 1) can be axially 31 inserted into said tool-receiving recess 4 from the tool-side longitudinal end 2.

The tool section 3 of the tool holder 1 is designed, in a manner known per se, as a shrink chuck, in which a shaft of a tool (not illustrated in FIG. 1) can be clamped utilizing the thermal expansion and shrinkage of the material of the main body.

In the example of a tool holder 1 shown in FIG. 1, the coupling section 6 comprises a coupling formation 7 in the form of a hollow shaft cone, referred to for short as HSC.

As can be seen from further exemplary embodiments which are not shown, the tool section 3 may also be designed in accordance with some other clamping principle, such as that of a hydraulic expansion chuck. Independently of this, it is likewise possible for the coupling section 6 to be configured with some other shaft design.

Axially 31 between the tool section 3 and the coupling section 6, there may be provided a handling formation 36 for the handling of the tool holder 1, for example by a gripper apparatus. As illustrated in FIG. 1, the handling formation 36 may comprise a gripper channel 37 which encircles the axis of rotation D in the circumferential direction 21.

In the example shown in FIG. 1, a central recess 38 extends axially 31 all the way through the main body 35, of which central recess 38 the tool-receiving recess 4 forms an axial section which can serve inter alia for the supply of coolant through the tool holder 1 to the processing location, at which processing location the tool (not illustrated) that is clamped in the tool holder 1 is in processing engagement with a workpiece to be processed, for example milling processing in the case of a milling tool.

For the monitoring of the operation of the tool holder 1 during the workpiece processing, the tool holder 1 is equipped with a measuring apparatus 8.

Said measuring apparatus 8 also makes it possible to identify, for example, abnormal states, such as tool breakages/wear, vibrations or other instabilities, for example chatter, in the tool holder 1. For this purpose, signals/data of the measuring apparatus are analyzed and evaluated/processed.

For this purpose, the measuring apparatus 8 provides various components which are arranged on the tool holder 1 and which are connected to one another (via cables), such as an acceleration sensor 9, an SMD antenna 11, a microcontroller (μC) 10 and a voltage/energy supply or battery 16 (cf. in particular FIGS. 2 to 8), which components are normally located, in accordance with a modular construction, as described below, on separate boards 12, 13, 14, 15 which are connected to one another via connection lines/cables 23 (not illustrated), 24, 25, such as a main board 14 with microcontroller (μC) 10, a (sensor) board 13 with acceleration sensor 9, and an (antenna) board 15 with SMD antenna 11.

Biaxial Acceleration Sensor 9

Figure 6:
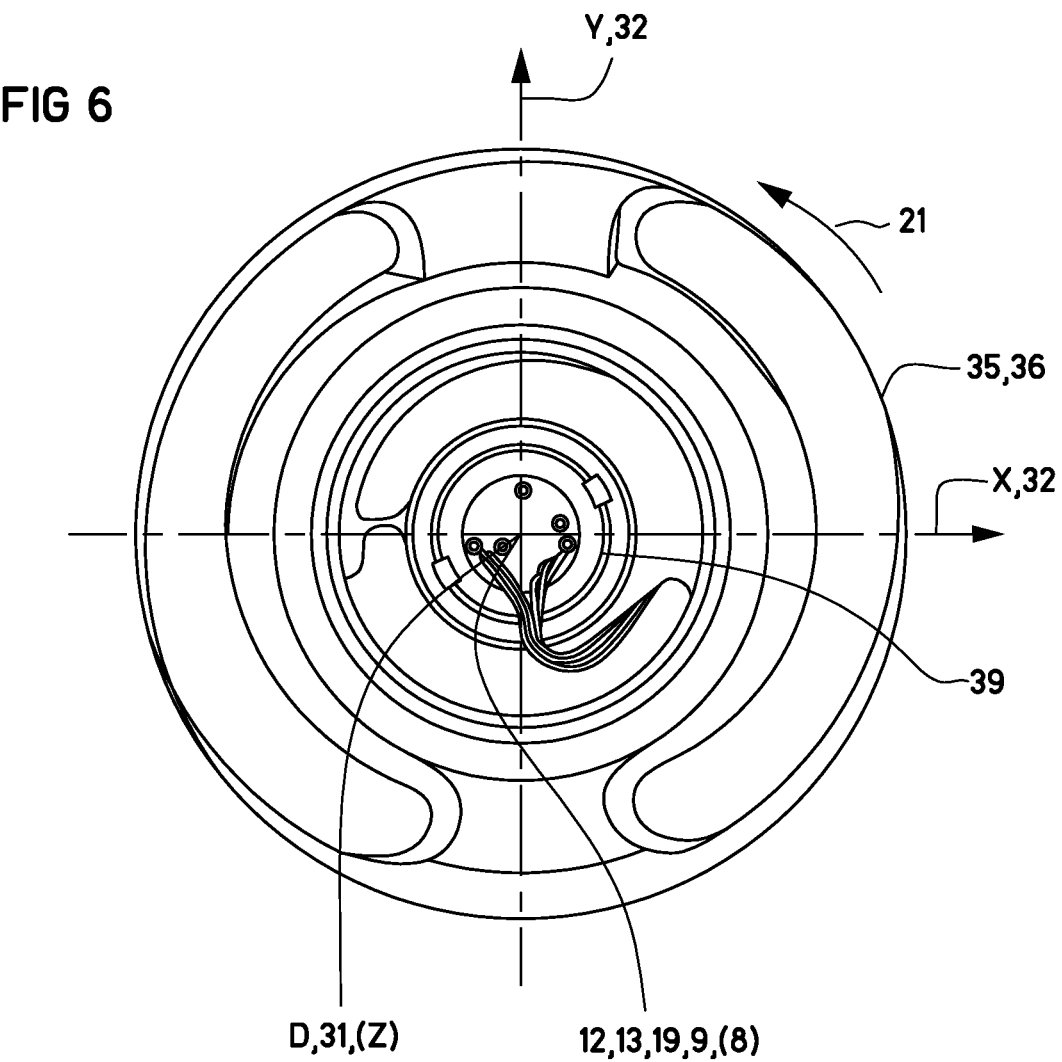
FIG. 6 shows a view of the tool holder as per FIG. 1 with a position of the sensor.
Figure 7:
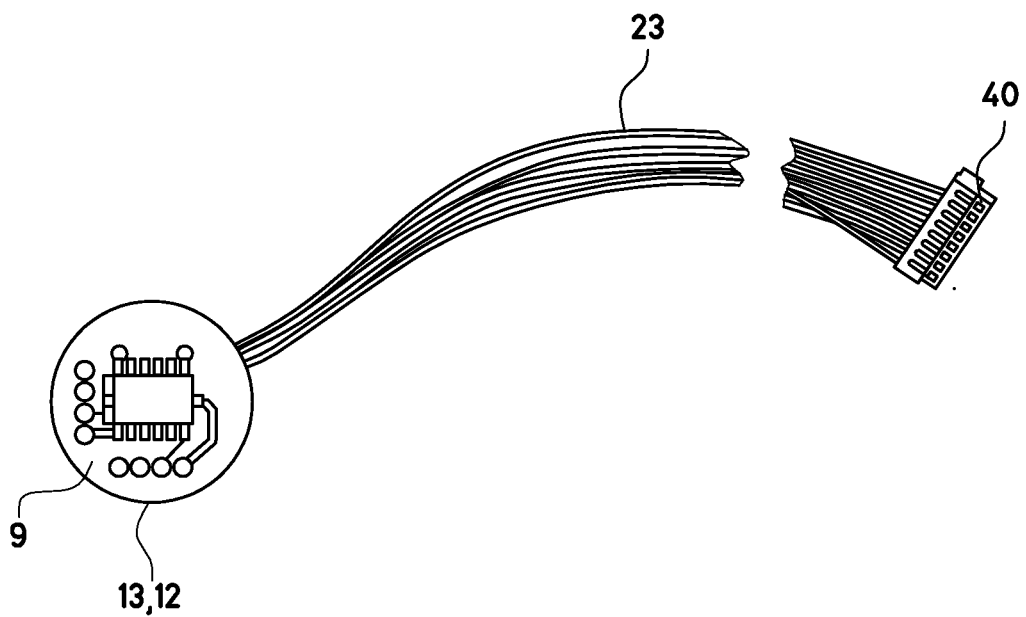
FIG. 7 shows a sensor board with the sensor and with wiring for the tool holder as per FIG. 1.
Figure 8:
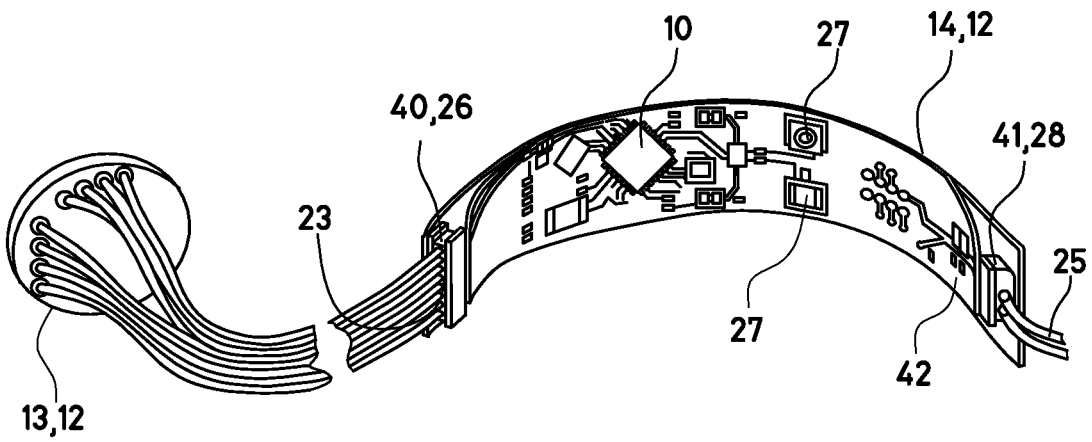
FIG. 8 shows the sensor board with the sensor and the (flexible) main board wired for the tool holder as per FIG. 1.

A major constituent part of the measuring apparatus 8 is, as illustrated in particular in FIGS. 6 to 8, a—in this case—biaxial acceleration sensor 9, the two measurement axes x and y of which are arranged orthogonally with respect to one another.

Implemented in modular fashion, and in order to be independent of other components of the measuring apparatus 8, this acceleration sensor 9 is located separately on a separate (sensor) board 13 (cf. FIGS. 7 and 8).

In order to keep centrifugal force influences on the acceleration sensor 9 resulting from the rotation of the tool holder 1 as low as possible, the acceleration sensor 9 is, as shown in particular in FIG. 6, located at the central point/on the axis of rotation D in the tool holder 1, wherein the measurement axes x and y (which are orthogonal with respect to one another) are oriented normally with respect to the axis of rotation D (and thus measure radial (32) accelerations in the axial directions x and y) (cf. FIG. 6).

As an alternative to this biaxial acceleration sensor 9, use may also be made of a triaxial acceleration sensor, the—then—three measurement axes x, y, z of which—in this case then—span an orthogonal coordinate system, and the third measurement axis z of which is then oriented axially 31 with respect to the tool holder axis of rotation (D) (not shown).

The (sensor) board 13 is, as is also shown in FIG. 6, adhesively bonded in a housing 39 which can be screwed—instead of the coolant pipe—into the tool holder 1. The acceleration sensor 9 is adhesively bonded directly to the housing 39 by means of instant adhesive.

The connection between the (sensor) board 13 and the main board 14 is, as can be seen in particular from FIG. 8 and FIG. 7, implemented in wired form (connection line 23 for the acceleration sensor 9 with plug connector 40 for a plug contact 26 for the connection line 23). A corresponding plug contact 26 is provided for this, that is to say for the plug connector 40, on the main board 14. It is also possible for wireless connections to be provided between the components instead of the wired connections.

Main Board 14 with Microcontroller (μC) 10

For the integration of the main board 14, which bears the microcontroller (μC) 10, into the tool holder 1, a circular or ring-shaped groove 33 which is concentric with respect to the axis of rotation D is formed into the tool holder 1, as shown in FIG. 3, which groove 33 runs around the central recess 38 in the tool holder 1 or the region of the coolant pipe (not illustrated here owing to the acceleration sensor).

The ring-shaped groove 33 is closed, as indicated in FIG. 2, by a cover 34 which can be screwed on, which is advantageous because this area is part of the HSC interface for the ejection of the tool holder 1 from the spindle.

Analogously to the (sensor) board 13 in the sensor housing 39, the main board 14 is potted (19) using a silicone protective coating after all components have been installed in the ring-shaped groove 33.

Figure 4:
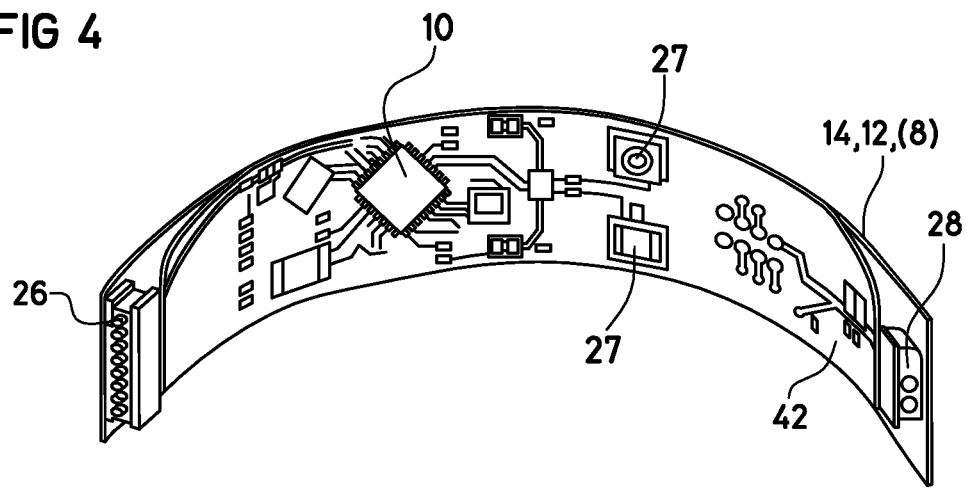
FIG. 4 shows a (flexible) main board with protective foil on the front and rear sides and with a sensor connection, microcontroller (µC) and antenna connection for the tool holder as per FIG. 1.
Figure 5:
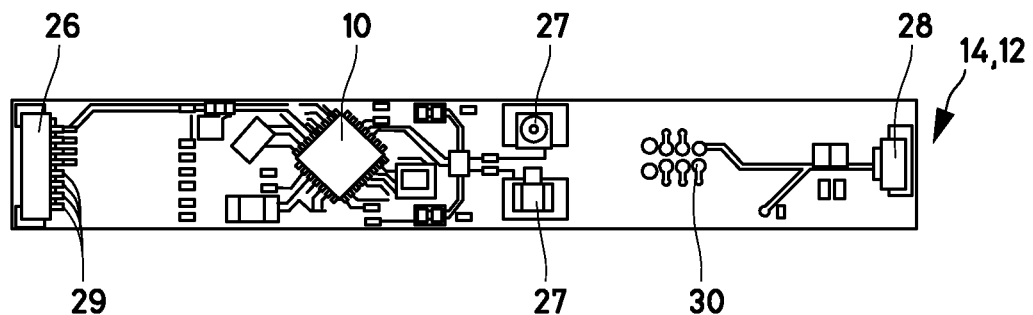
FIG. 5 shows the (flexible) main board with sensor connection (plug contacts), microcontroller (μC), antenna connection, programming contacts and energy supply connection (plug contacts) for the tool holder as per FIG. 1.

As illustrated by FIGS. 3 to 5, the main board 14 is designed as a flexible "strip", because this yields major advantages in particular for the installation process. A flexible board can be adjusted into the shape of the circular groove 33 without great effort (here, cf. also FIG. 3 and FIG. 4) and is easier to handle/install than a rigid variant during the connection of the various connecting lines/cables 23, 24 (not illustrated) 25.

FIG. 5 shows the plan view of the populated main board 14 (without connected lines/cables 23, 24, 25 (cf. FIG. 8)). FIG. 5 shows the top side of the main board 14 on which all components are fitted; only the conductor tracks are present on the rear side of the main board 14.

All connection lines/cables 23, 24 (not illustrated), 25, such as that (23) for the acceleration sensor 9, that (25) for the energy supply 16 and that (24 (not illustrated)) for the antenna 11, are implemented by means of plug contacts 26, 27, 28, which is advantageous for easy and flexible installation.

Situated at the left-hand edge of the main board 14, as shown in FIG. 5, is the connection plug contact 26 for the connection line 23 or the plug connector 40 of the acceleration sensor 9. (Free) contacts 29 situated underneath may be used for further sensor signals if appropriate.

Located slightly to the left of the center of the main board 14 as it is shown in FIG. 5 is the microcontroller (μC) 10 with various components, which microcontroller reads out the signals/data from the acceleration sensor 9.

Signals/data are read out via SPI from the acceleration sensor 9, which—in this case—provides values for the two measurement axes, specifically x and y.

If more than one value is required at a point in time, then it is necessary for all values to be transmitted in one read operation. After a completed read operation, the values from the acceleration sensor 9 are discarded, and the chronologically subsequent values are loaded for the next read operation.

The acceleration sensor 9 transmits the data bytewise, wherein the individual values are each composed of two bytes. Additionally, the acceleration sensor 9 firstly transmits the "rear part" of the overall value, followed by the "front part", which must be put together by the software of the microcontroller (μC) 10. The data are aggregated by the microcontroller (μC) 10 and prepared for transmission.

To the right of the center of the main board 14 as it is shown in FIG. 5, there are two facilities, that is to say plug contacts, for the connection of antennae, of which, in the case of the first tool holder 1, one (in this case the upper plug contact 27) is used for the SMD antenna 11, which transmits (by Bluetooth transmission) signals/data to outside the tool holder 1, for example to a CMS.

Further to the right in the case of the main board 14 as it is shown in FIG. 5, it is possible to see a multiplicity of programming contacts 30, and at the right-hand edge of the main board 14, it is possible to see the connections or the plug contact 28 for the voltage/energy supply 16.

In order to protect the components of the main board 14, the front and rear sides of the main board 14 may if appropriate have a protective foil 42 adhesively bonded thereon, as illustrated in FIG. 4.

SMD Antenna 11

The SMD antenna 11, which is located on the separate antenna board 15 (cf. FIG. 2), is attached to the tool holder 1, as shown in FIGS. 1 and 2, via a circular pocket 17 on the gripper collar 43, which circular pocket is connected via an oblique connecting/connection bore 22 (for the connection line 24 (not illustrated)), which is eccentric in order to prevent kinks in the connection line 24 (not illustrated), to the circular groove 33 that receives the main board 14.

Figure 9:
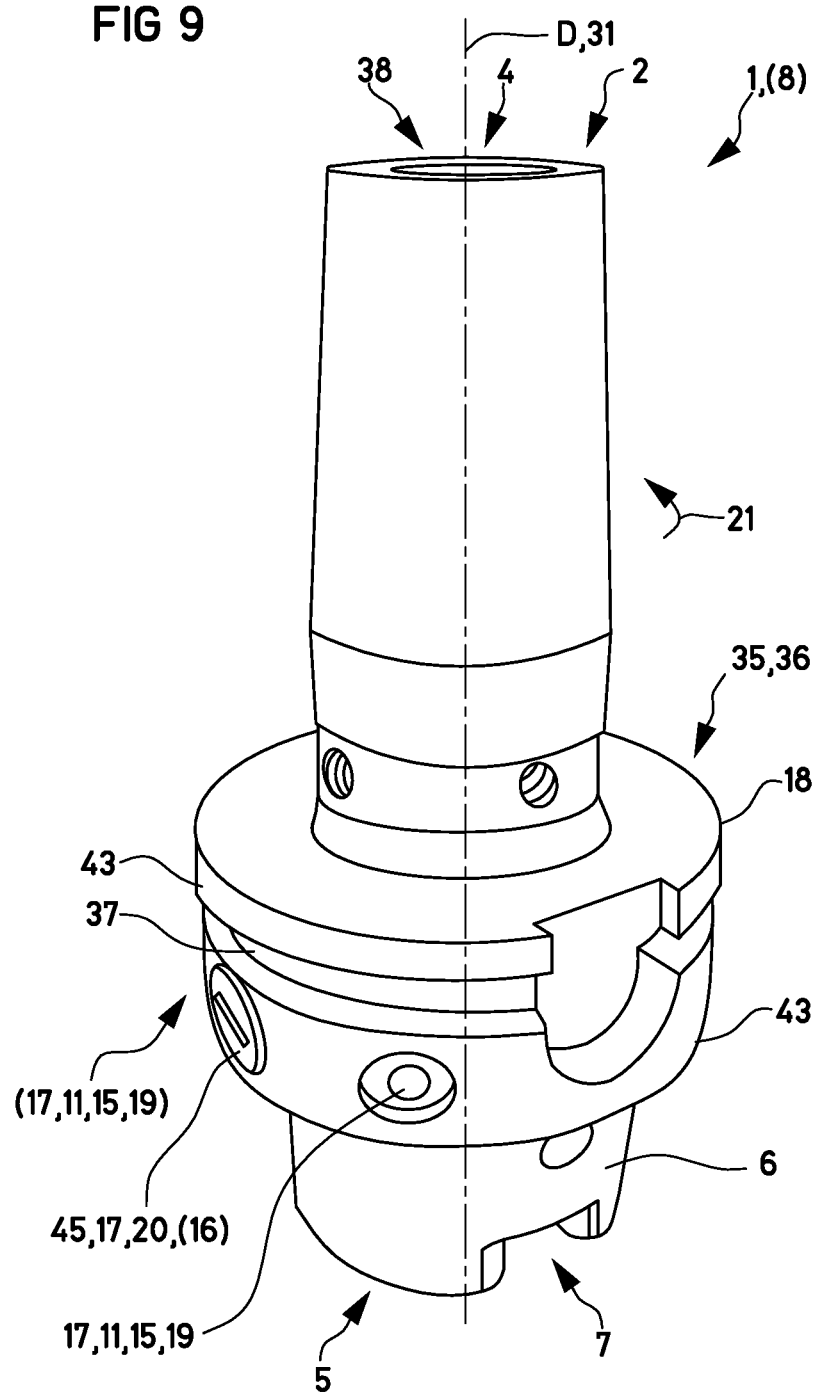
FIG. 9 shows a tool holder with clamping chuck (in this case shrink chuck) according to a further embodiment with two wire antennae.
Figure 10:
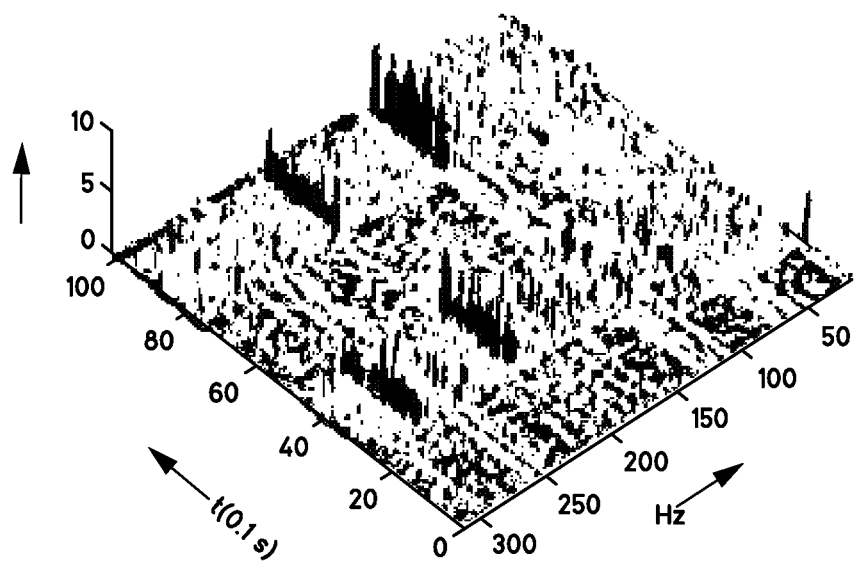
FIG. 10 shows processing/sensor data of a tool holder with a uniaxial acceleration sensor.
Figure 11:
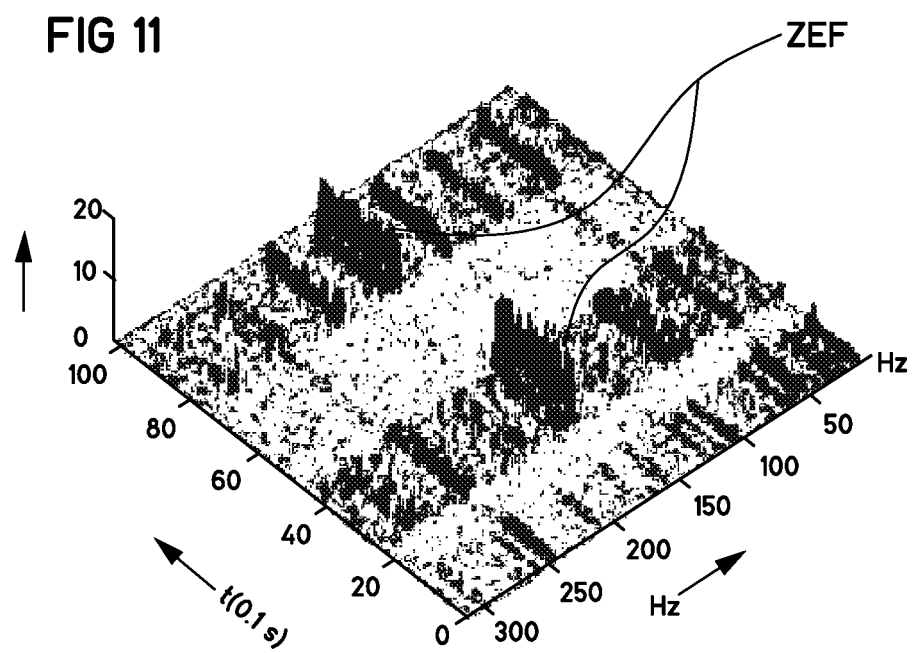
FIG. 11 shows processing/sensor data of a tool holder according to the invention with a biaxial acceleration sensor with two radial measurement axes.

If appropriate, a second, oppositely situated and identical circular pocket (17) may be formed in the gripper collar (43) in order firstly to improve the quality of balancing of the tool holder 1 and secondly to make it possible to realize other antenna concepts with two antennae (11) (and possibly improved transmission power as a result) (cf. in this case FIG. 9 or tool holder 1 according to the second embodiment with two wire antennae 11). For this purpose, the second antenna connection (in this case further plug contact 27) is already provided on the main board 14 (see above).

For the fastening of the antenna board 15 in the circular pocket 17, said antenna board is potted (19) by means of a silicone (or alternatively covered), or the same silicone protective coating 19 as for the main board 14 may be used.

Energy Supply/Battery 16

The energy/voltage supply 16 or the battery 16 is attached in a similar manner to the SMD antenna 11, as shown in FIGS. 1 and 2, via a further circular pocket 17 (battery compartment 45) on the gripper collar 43, which further circular pocket is—likewise—connected via an oblique connecting bore 22 (for the connection line 25), which is eccentric in order to prevent kinks in the connection line 25, to the circular groove 33 that receives the main board 14.

The battery 16 is fastened in the battery compartment 45 by means of a cover 20 that can be screwed on (cf. FIG. 1) which—capable of being screwed onto the battery compartment 45—closes the latter and simultaneously also produces contact with the battery 16. Said cover 20 also makes it possible for the battery 16 to be exchangeable from the outside.

If appropriate, it is also possible for a seal (not illustrated) to be provided at the battery compartment 45, which seal protects the battery compartment against an ingress of liquid (not shown).

The following part of the description is directed to the tool holder 1 with sensor arrangement as illustrated in FIG. 9.

FIG. 9 shows a further embodiment of a tool holder 1 according to the invention, referred to for short merely as second tool holder 1.

This further or second tool holder 1 differs from that according to the first embodiment, that is to say the first tool holder 1 (cf. FIGS. 1 to 8), merely in that it provides a different type of antenna 11.

Aside from this, this second tool holder 1 also provides the acceleration sensor 9, as in the first embodiment, and also all of the other components, which are however not mentioned in any more detail hereinbelow but have been described in conjunction with the first tool holder 1. More detailed statements in this regard can be found in the statements relating to the first tool holder 1.

By contrast to the first embodiment (here, an SMD antenna 11 has been installed in a circular pocket 17 on the circumference 21 of the first tool holder 1 (cf. FIG. 2)), this second tool holder 1 provides, as shown in FIG. 9, two wire antennae 11 which—in each case likewise arranged in recessed fashion in circular pockets 17—are arranged in uniformly distributed fashion on the circumference 21 of the second tool holder 1. Said wire antennae are also each connected via connection lines/cables to the main board or antenna connections/plug contacts 27 situated thereon.

Here, too, the circular pockets 17, which receive the two wire antennae 11, on the circumference 21 of the tool holder 1 may again be potted by means of a silicone (19) (or alternatively covered).

Although the invention has been illustrated and described in more detail using the preferred exemplary embodiments, the invention is not restricted by the disclosed examples and other variations can be derived therefrom without departing from the scope of protection of the invention.

The following is a summary list of reference numerals and the corresponding structure used in the above description of the invention:

1 Tool holder
2 (First, tool-side) axial longitudinal end
3 Tool section
4 Tool-receiving formation, tool-receiving recess
5 (Second, coupling-side) axial longitudinal end
6 Coupling section
7 Coupling formation
8 Measuring apparatus
9 (Acceleration) sensor
10 Microcontroller (μC)
11 Transmission device, antenna, SMD antenna, wire antenna
12 Circuit board, board
13 (Sensor) board
14 Main board
15 (Antenna) board
16 Energy supply, voltage supply, battery
17 Depression, circular pocket
18 Outer surface
19 Potting compound, silicone compound
20 Lid, cover (for battery compartment)
21 Circumferential direction (of the tool holder (1)), also circumference
22 Connection bore, connecting bore
23 Connection line (for acceleration sensor)
24 Connection line (for transmission device)
25 Connection line (for energy supply)
26 Plug contact(s) for the connection line (for the acceleration sensor)
27 Plug contact(s) for the connection line (for the transmission device)
28 Plug contact(s) for the connection line (for the energy supply)
29 Free plug contacts
30 Programming contacts
31 Axial direction
32 Radial direction
33 Annular/ring-shaped groove
34 Cover (for ring-shaped groove)
35 (Tool holder) main body
36 Handling formation
37 Gripper channel
38 Central recess
39 Housing (for the (sensor) board 13)
40 Plug connector (for the plug contact for the connection line (for the acceleration sensor))
41 Plug connector (for the plug contact for the connection line (for the energy supply))
42 Protective film
43 Gripper collar
45 Battery compartment
D Tool holder axis of rotation, axis of rotation
x Measurement axis
y Measurement axis
z Measurement axis
ZEF Central meshing frequency

The invention claimed is:

1. A tool holder configured for rotation about a tool holder axis of rotation defining an axial direction, the tool holder comprising:
a first axial longitudinal end having a tool section with a tool-receiving formation for receiving a tool;
a second axial longitudinal end having a coupling section with a coupling formation for torque-transmitting coupling to a machine spindle of a machine tool;
a measuring apparatus mounted for rotation with the tool holder and for acquiring data relating to an operation of the tool holder, said measuring apparatus having an acceleration sensor with at least two measurement axes that are oriented substantially radially with respect to the tool holder axis of rotation and being configured for measuring oscillations in a range between 50 Hz and 300 Hz along the at least two measurement axes, and said sensor being arranged in the tool holder axis of rotation, with said measurement axes of said sensor intersecting one another in the tool holder axis of rotation and said measurement axes of said sensor being orthogonal to the tool holder axis of rotation; and
said measuring apparatus having a circuit board disposed concentrically around said sensor and the tool holder axis of rotation, said circuit board being electrically connected to said sensor via a flexible connection line, and said circuit board being disposed in a circular or ring-shaped groove formed in said tool holder concentric with the tool holder axis of rotation.

2. The tool holder according to claim 1, wherein said two measurement axes of said sensor are oriented orthogonally with respect to one another.

3. The tool holder according to claim 1, wherein said sensor has three measurement axes which are oriented orthogonally with respect to one another and which span an orthogonal coordinate system, with a third of the measurement axes being oriented substantially axially with respect to the tool holder axis of rotation.

4. The tool holder according to claim 1, further comprising electronics components selected from the group consisting of a microcontroller, one or more transmission devices, one or more antennae, one or more circuit boards, and one or more energy supplies mounted on said circuit board of said measuring apparatus.

5. The tool holder according to claim 4, wherein said sensor is arranged on a separate circuit board and said microcontroller is supported on said circuit board of said measuring apparatus that is different from said separate circuit board supporting said sensor.

6. The tool holder according to claim 4, wherein said antenna is a surface mounted device antenna or a wire antenna.

7. The tool holder according to claim 4, wherein said antenna is arranged on a separate circuit board or is a self-adhesive foil antenna.

8. The tool holder according to claim 1, wherein the tool holder has an outer surface formed with a depression and a transmission device and/or an energy supply is recessed in said depression.

9. The tool holder according to claim 8, wherein said depression is a circular pocket on the outer surface of the tool holder, and said depression is potted and/or covered.

10. The tool holder according to claim 8, wherein said depression is a circular pocket that is potted with a silicone compound.

11. The tool holder according to claim 1, further comprising two or more transmission devices distributed in a circumferential direction about the tool holder axis of rotation.

12. The tool holder according to claim 1, wherein the tool holder is formed with one or more connection bores running obliquely with respect to the tool holder axis of rotation.

13. The tool holder according to claim 1, wherein said the sensor has an SPI interface and/or electronics in the tool holder have SPI interfaces and/or an SPI bus.

14. The tool holder according to claim 1, further comprising an energy supply in the tool holder.

15. The tool holder according to claim 1, wherein said tool-receiving formation is a device selected from the group consisting of a shrink chuck, a hydraulic expansion chuck, a face mill arbor, a collet chuck, and a power chuck.

16. The tool holder according to claim 1, wherein said coupling formation comprises a hollow shaft cone or a steep-angle taper and/or an engagement formation for a ball-type clamping system or a polygonal hollow shaft.

17. A machine tool, comprising a tool holder according to claim 1.

* * * * *